United States Patent
Auger

(10) Patent No.: US 9,684,810 B2
(45) Date of Patent: Jun. 20, 2017

(54) SYSTEM AND METHOD FOR PARTITE OPTICALLY READABLE CODE

(71) Applicant: D2L CORPORATION, Kitchener (CA)

(72) Inventor: Jeremy Auger, Kitchener (CA)

(73) Assignee: D2L CORPORATION, Kitchener, Ontario (CA)

( * ) Notice: Subject to any disclaimer, the term of this patent is extended or adjusted under 35 U.S.C. 154(b) by 115 days.

(21) Appl. No.: 13/930,135

(22) Filed: Jun. 28, 2013

(65) Prior Publication Data

US 2014/0263652 A1 Sep. 18, 2014

Related U.S. Application Data

(60) Provisional application No. 61/791,576, filed on Mar. 15, 2013.

(51) Int. Cl.
*G06K 7/14* (2006.01)

(52) U.S. Cl.
CPC ................... *G06K 7/1491* (2013.01)

(58) Field of Classification Search
CPC .................... G06K 7/1491; G06K 7/1465
USPC ............... 235/462.12, 462.01, 494
See application file for complete search history.

(56) References Cited

U.S. PATENT DOCUMENTS

| | | | |
|---|---|---|---|
| 5,278,398 A * | 1/1994 | Pavlidis et al. | 235/462.12 |
| 5,296,691 A * | 3/1994 | Waldron et al. | 235/462.12 |
| 5,726,435 A | 3/1998 | Hara et al. | |
| 5,773,806 A * | 6/1998 | Longacre, Jr. | 235/462.1 |
| 5,821,519 A * | 10/1998 | Lee et al. | 235/462.27 |
| 6,279,830 B1 | 8/2001 | Ishibashi | |
| 6,494,375 B1 | 12/2002 | Ishibashi et al. | |
| 7,213,759 B2 * | 5/2007 | Reichenbach et al. | 235/462.01 |
| 8,162,222 B2 | 4/2012 | Krichi et al. | |
| 2009/0121027 A1 * | 5/2009 | Nadabar | 235/470 |

* cited by examiner

*Primary Examiner* — Suezu Ellis
(74) *Attorney, Agent, or Firm* — Gowling WLG (Canada) LLP; Neil Henderson

(57) ABSTRACT

A system and method for partite optically readable codes are provided. The method includes: scanning at least one component of the partite optically readable code, wherein the partite optically readable code comprises of at least two components; determining whether the remaining components of the partite optically readable code are accessible; combining all the components of the partite optically readable code; and decoding the partite optically readable code. The system includes: a scanning module configured to retrieve a component of a partite optically readable code, wherein the partite optically readable code comprises at least two components; and a code module configured to receive the component from the scanning module, the code module further configured to determine whether the remaining components of the partite optically readable code are accessible, to combine the components of the partite optically readable code, and to decode the partite optically readable code.

17 Claims, 8 Drawing Sheets

SYSTEM AND METHOD FOR PARTITE OPTICALLY READABLE CODE

FIELD

The present disclosure relates generally to optically readable codes. More particularly, the present disclosure relates to embodiments of a system and method for partite optically readable codes.

BACKGROUND

Optically readable codes are traditionally machine-readable codes that encode a predetermined amount of data, such as typically used for strings of numeric, alphanumeric, binary or other characters. The data strings may provide information about, for example, an item, an object, an entity, a website, a contact, a program, a service, or the like. Optically readable codes are generally either one-dimensional (or linear) barcodes or two-dimensional (or matrix) geometric patterns. The optically readable codes are typically read and interpreted by optical scanners that may be included in a specialized piece of equipment or may be a part of another device such as, for example, a camera of a mobile phone provided with scanning software.

Optically readable codes have become used more broadly recently as mobile devices such as, for example, tablet computers and smart phones, that have the ability to recognize an optically readable code become more available. According to the related art, the optically readable codes are simply scanned and decoded to provide users with the encoded data, such as a website or the like. In this situation, systems and methods for handling optically readable codes may be improved.

The above information is presented as background information only to assist with an understanding of the present disclosure. Not determination has been made, and no assertion is made, as to whether any of the above might be applicable as prior art with regard to the present disclosure.

SUMMARY

In a first aspect, the present disclosure provides a method for a partite optically readable code, the method includes: scanning at least one component of the partite optically readable code, wherein the partite optically readable code comprises of at least two components; determining whether the remaining components of the partite optically readable code are accessible; combining the components of the partite optically readable code; and decoding the partite optically readable code.

In a particular case, the components of the partite optically readable code may be separate physical sections of the partite optically readable code.

In another particular case, the at least two components of the partite optically readable code may be combined using an assembly algorithm.

In yet another particular case, the assembly algorithm may be bit-addition, bit-subtraction, bit-multiplication, bit-division, or logical bit-operations.

In another particular case, the assembly algorithm may include combination data related to combining interlaced segments of the partite optically readable code.

In a particular case, the components of the partite optically readable code may include at least one of a finder pattern, a timing pattern, a quiet zone, an alignment, a version, an identification, or a formatting facet.

In another particular case, one of a finder pattern, a timing pattern, a quiet zone, an alignment, a version, an identification, or a formatting facet of the partite optically readable code may include an indicator of an assembly algorithm to be performed.

In yet another particular case, the scanning, the combining and the decoding of the partite optically readable code may be processed on a user device.

In another particular case, the combining of the components of the partite optically readable code may include determining whether the combined components are a completed partite optically readable code or a component of a larger aggregate partite optically readable code.

In a particular case, the method may include sending the scanned component of the partite optically readable code to a network device.

In another particular case, a first user may send at least one scanned component of the partite optically readable to a network device, and a second user may send at least one scanned component of the partite optically readable code to the network device within a predetermined time interval.

In yet another particular case, a first user may send at least one scanned component of the partite optically readable to a second user.

In another aspect, there is provided a system for partite optically readable code, the system includes: a scanning module configured to retrieve a component of a partite optically readable code, wherein the partite optically readable code comprises at least two components; and a code module configured to receive the component from the scanning module, the code module further configured to determine whether the remaining components of the partite optically readable code are accessible, to combine the components of the partite optically readable code, and to decode the partite optically readable code.

In a particular case, the components of the partite optically readable code may be separate physical sections of the partite optically readable code.

In another particular case, the at least two components of the partite optically readable code may be combined using an assembly algorithm.

In another particular case, the assembly algorithm may be bit-addition, bit-subtraction, bit-multiplication, bit-division, or logical bit-operations.

In yet another particular case, the assembly algorithm may include combination data related to combining interlaced segments of the partite optically readable code.

In another particular case, one of a finder pattern, a timing pattern, a quiet zone, an alignment, a version, an identification or a formatting facet of the partite optically readable code may include an indicator of an assembly algorithm to be performed.

In a particular case, the system may reside on a user device.

In another particular case, the system may include a transmitter on a user device configured to send the scanned component of the partite optically readable code to a network device.

In yet another aspect, there is provided a non-transitory computer readable medium containing instructions that, when executed, perform the method of scanning at least one component of the partite optically readable code, wherein the partite optically readable code comprises of at least two components; determining whether the remaining components of the partite optically readable code are accessible; combining all the components of the partite optically readable code; and decoding the partite optically readable code.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

Throughout the drawings, like reference numerals will be understood to refer to like parts, components, and structures.

DETAILED DESCRIPTION

The following description with reference to the accompanying drawings is provided to assist in a comprehensive understanding of example embodiments of the method and system as defined by the claims and their equivalents. The following description includes various specific details to assist in that understanding but these are to be regarded as merely exemplary. Accordingly, those of ordinary skill in the art will recognize that various changes and modifications of the embodiments described herein can be made without departing from the scope and the spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of the example embodiments is provided for illustration purpose only and not for the purpose of limiting the scope as defined by the appended claims and their equivalents.

Generally, the present disclosure provides embodiments of a system and method for generating and reading partite optically readable codes. The embodiments of the system and method detailed herein scan a component of a partite optically readable code, wherein the partite optically readable code comprises at least two components or parts. According to an example embodiment, the system further determines whether at least one other component of the optically readable code is stored or is scanned within a predetermined time interval. The system combines the components of the partite optically readable code and decodes the completed optically readable code. Partite optically readable codes, or optically readable codes in at least two components are intended to be beneficial for obtaining information about, for example, an item, an object, an entity, a website, a contact, a program, a service and/or the like. In particular, partite optically readable codes may be used in cases in which more than one user is required to access specific information such as, for example, when multiple parties agree to use a password or review content in parallel.

One-dimensional codes (e.g., Universal Product Codes (UPCs), International Article Number (EAN), GS1 DataBar, and the like) typically take the form of barcodes. An example of a one-dimensional code is the Universal Product Code, International Standard ISO/IEC 15420.

Figure 1:
FIG. 1 illustrates an example of a UPC barcode according to the related art.

FIG. 1 illustrates an example of a UPC barcode according to the related art.

Referring to FIG. 1, a UPC 100, which traditionally consists of a strip of black bars and white spaces which correspond with 12 numerical digits. Each separate digit is represented visually as each number has only one bar sequence representation. Additionally, the UPC 100 includes coding and error-checking digits, and non-numerical identifier bars.

Two-dimensional codes such as, for example quick response codes, SPARQCode, or Data Matrix code, or the like, are typically capable of providing more information than one-dimensional codes and typically consist of geometric patterns such as squares, rectangles, lines and circles.

Figure 2:
FIG. 2 illustrates an example of a QR code according to the related art.

FIG. 2 illustrates an example of a QR code according to the related art.

Referring to FIG. 2, a quick response code or QR Code™ 200 is illustrated. A typical QR code includes position detection patterns, alignment patterns, timing patterns, format information, error correction areas, data areas and quiet zones. There are various versions of QR codes which may vary in size or may include additional features.

Although the examples presented herein are shown using an optically readable code as two-dimensional QR code, the methods and systems described herein are intended to work with any optically readable code such as, for example one-dimensional optically readable codes, or the like, two-dimensional optically readable code, or the like, and may be extrapolated to three-dimensional codes.

Figure 3:
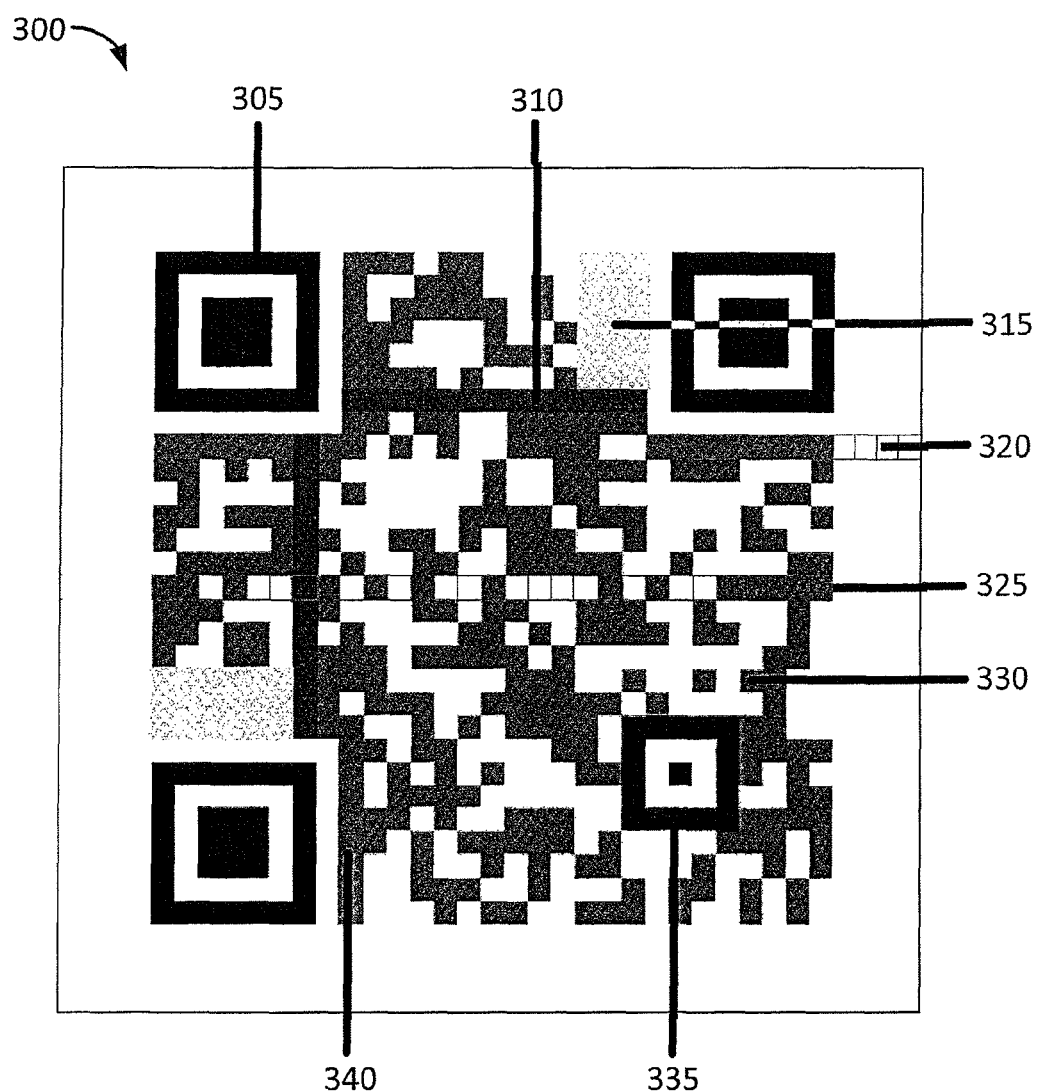
FIG. 3 illustrates an example of a QR code illustrating the various parts according to the related art.

FIG. 3 illustrates an example of a QR code illustrating the various parts according to the related art.

Referring to FIG. 3, a version 3 QR code 300 includes a finder pattern 305, a timing pattern 310, a version identifier 315, a quiet zone 320, a row of modules 325, a data area 330, an alignment pattern 335, and format data 340. The finder pattern 305 includes areas that are used to identify that the code is a QR code. The timing pattern 310 includes areas that are used as an offset marker. The version identifier 315 identifies the version of the QR code 300. The quiet zone 320 is used to provide a light border to the QR code 300. The data area 330 is an area in which the strings of information are encoded. Each 'dot' or 'square' that makes up the QR code grid is called a module. The row of modules 325 is shown in the version 3 QR code 300, as 29 modules, and the QR code is 29 modules by 29 modules. The alignment pattern 335 may be used to correct for any skew. Format data 340 may be used to record the error correction level and the mask pattern in the QR code.

QR codes according to the related art typically have four different error correction levels that are chosen according to the operating environment. Depending on the correction level, a lower or higher percentage of codewords of the QR code can be restored. A codeword is a unit that constructs the data area, whereby one codeword is equal to 8 bits. Increasing the error correction level improves error correction capabilities but also either increases the size of the QR code or decreases the amount of data which can be encoded.

Error correction level L (Low) provides that 7% of the total codewords in the QR code can be restored. Error correction level 'M' (Medium) provides that 15% of the total codewords in the QR code can be restored. Error correction level 'Q' (Quartile) provides that 25% of the total codewords in the QR code can be restored. Finally, error correction level 'H' (High) provides that 30% of the total codewords in the QR code can be restored.

To select the proper error correction level, the operating environment and the QR code size should be considered. Levels Q or H may be appropriate for dirty or rough environments such as a factory, whereas levels L or M may be more appropriate for cleaner and gentler environments. Level M is the most frequently used error correction level.

Figure 4:
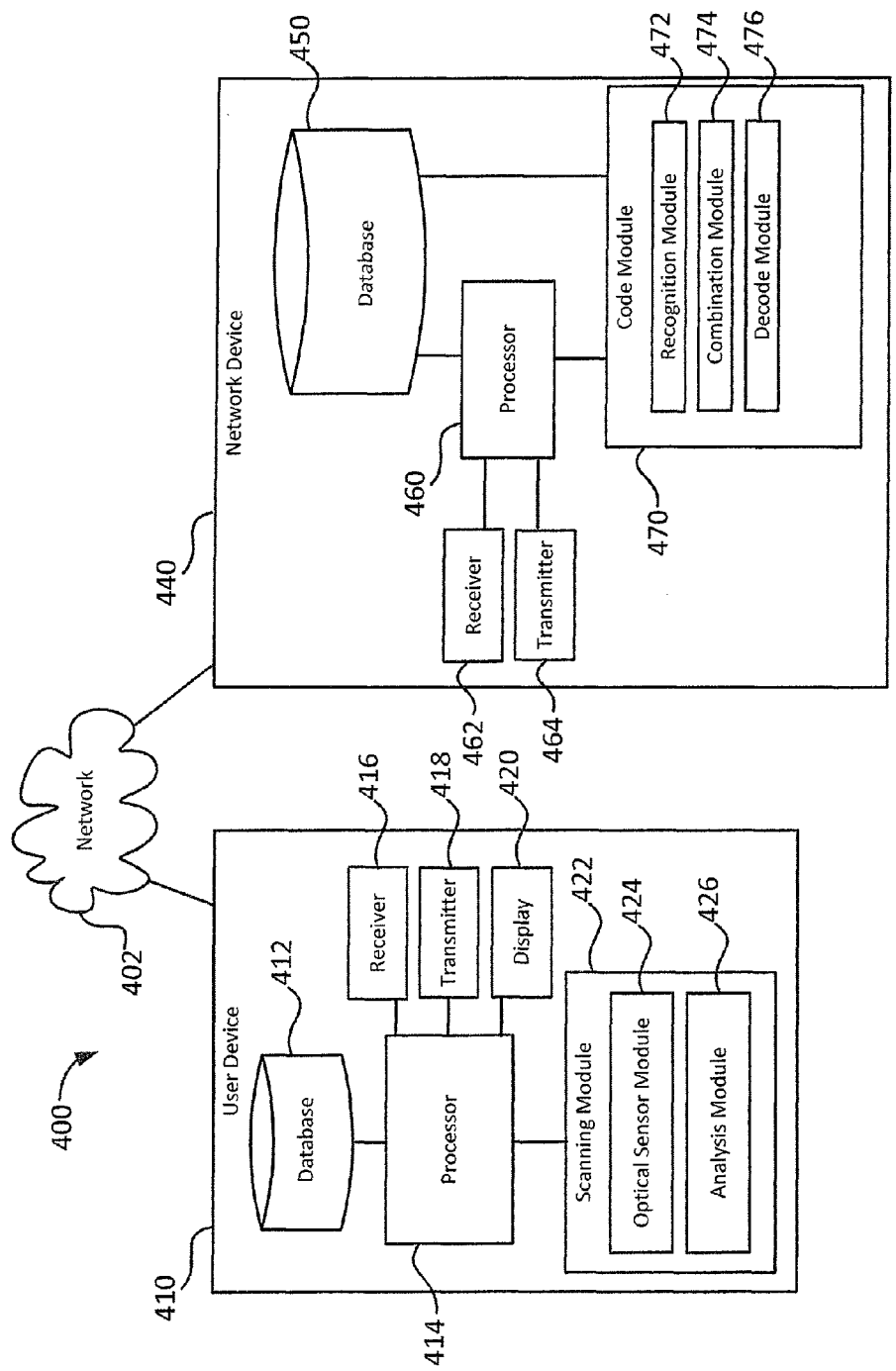
FIG. 4 is a schematic block diagram of a system for partite optically readable codes according to an example embodiment.

FIG. 4 is a schematic block diagram of an embodiment of a system 400 for partite optically readable codes according to an example embodiment.

Referring to FIG. 4, the system 400 is accessed by a user on a user device 410. The user device 410 is connected to at least one network device 440 over a network 402.

The user device 410 is a computing device and may be a specialized scanning device or may be another computing device such as, for example, a personal computer, a personal digital assistant, a smart phone, a tablet, a camera, or the like. The system 400 may be accessed by a plurality of user devices 410. The network device 440 may be a separate computing device configured to transmit and receive data related to one or more services or applications run on one or more user devices 410. The network device 440 may be a stand-alone device or an arrangement of two or more devices working in conjunction with each other. The network 402 may be the Internet, a Local Area Network (LAN), a Wide Area Network (WAN), a Personal Area Network (PAN), an enterprise network, a Virtual Private Network (VPN), or the like.

In some cases, the user device 410 and network device 440 may be a single device such as, for example, when the system is hosted on a personal computer or when a user directly accesses the network device 440. In this case, the data is transmitted directly between the system modules and will not necessarily be transmitted through the network 402.

The user device 410 includes a memory component, for example a database 412 to store data, a processor 414 configured to execute instructions, a receiver 416 to receive data from the network 402, a transmitter 418 to transmit data over the network 402, a scanning module 422 configured to input data into the system 400, and a display component 420 configured to display data to the user, for example, using a screen, monitor, or the like. In some cases, where the user device 410 is a scanning device, the scanning device may not include a display, or may include notification lights (e.g., LEDs, or the like), or audible alerts to provide feedback to the user.

The scanning module 422 receives user input, for example, the scanning module 422 may be activated by a user and may include a user input option when the user has placed the scanning module 422 above at least one component of an optically readable code including at least two components (sometimes referred to as a partite optically readable code). For example, the scanning module 422 may be operatively connected to a camera (not shown) in a smart phone, and the scanning module 422 may be activated by the user when the camera has focused in on at least one component of the partite optically readable code. In some cases, the scanning module 422 may be "always-on" and may detect a component of the partite optically readable code without the user activating the scanning module 422.

The scanning module 422 includes an optical sensor module 424 and an analysis module 426. The optical sensor module 424 captures an image of the optically readable code via, for example, a camera, a scanner, a laser or other optical sensing device. The captured image is analyzed by the analysis module 426. The analysis module 426 is configured to transform the image into machine-readable code, for example, binary data. The analysis module 426 may also perform further analysis to determine if the partite optically readable code is complete or if the partite optically readable code requires at least one further component.

If all the components of the partite optically readable code have been retrieved, the analysis module 426 sends the image or the machine-readable code representing the image to the transmitter 418 to transmit to the network device 440 over the network 402. The network device 440 is configured to decode the partite optically readable code and to transmit the decoded data back to the user device 410. In some cases, the user device 410 may decode the completed optically readable code without requiring input from the network device 440.

The analysis module 426 may determine that the partite optically readable code is incomplete. The analysis module 426 may review the database 412 to determine whether any further components of the partite optically readable code are stored by the user device 410. If the analysis module 426 retrieves at least one additional component of the partite optically readable code, the analysis module 426 determines whether the partite optically readable code is now complete. In some cases, the analysis module 426 determines whether at least one additional component is stored and may send a plurality of components to the network device 440 to combine to form the partite optically readable code. The analysis module 426 transmits the partite optically readable code, or the at least one component of the optically readable code to the network device 440.

The network device 440 includes a receiver 462 for receiving data transmitted from the network 402 and a transmitter 464 for transmitting to the network 402. The network device 440 further includes a code module 470 configured to recognize, combine and decode components of partite optically readable codes. The code module 470 is operatively connected to a memory component 450 (e.g., a database), and a processor 460. The processor 460 is configured to execute the instructions received from the code module 470. The processor 460 may be a central processing unit of the network device 440 or may be a processing module for the system 400.

The network device 440 receives the at least one component of the partite optically readable code for analysis by the code module 470. The code module 470 includes a recognition module 472, which is configured to review the component and retrieve optically readable code data from the database 450. The recognition module 472 is configured to determine whether there are previous component(s) of the optically readable code stored in the database 450 and whether the user has the authorization to retrieve or review a stored component of the partite optically readable code. The recognition module 472 may further be configured to identify an assembly algorithm or orientation pattern related to the combination data for the assembly of the at least two components of the partite optically readable code.

The code module 470 includes a combination module 474 configured to combine the at least two components of the partite optically readable code. The combination module 474 uses the assembly algorithm or orientation pattern to combine the components of the optically readable code. In some cases, the combination module 474 is configured to decode or retrieve the assembly algorithm or orientation pattern from the at least one component of the partite optically readable code. If the combination module 474 determines that the partite optically readable code is complete, then the complete optically readable code is transmitted to a decode module 476 at which the optically readable code is decoded.

If the combination module 474 determines that not all of the components of the partite optically readable code have been obtained, then the combination module 474 may direct the database 450 to store the components of the optically readable code until further components are transmitted to the network device 440. In some cases, the code module 470 will notify the user via the user device display 420 that the partite optically readable code is incomplete and is missing at least one further component.

In an example, the code module 470 is configured to receive at least two optically readable code components from a first user and a second user concurrently or consecutively. The at least two optically readable code components could be combined and decoded as a key to unlock desired content, for example, to unlock an application, a document, or the like. The code module 470 may include a timer and may have a predetermined time interval (e.g., one second, five second, one minute, 15 minutes, one day, or the like), in which the components are to be received or the partite optically readable code will not unlock the desired content. If a first and second user are both required to be accessing the desirable content together, the partite optically readable code may serve as a key and the content may only be unlocked if the components of the optically readable code are received within the predetermined time interval or based on other criteria. In some cases, the first user device may send the scanned component to the second user device and the second user device is configured to combine the components and decode the partite optically readable code. This is intended to be beneficial in cases where a first user may have to give authorization to a second user to access content.

Figure 5B:
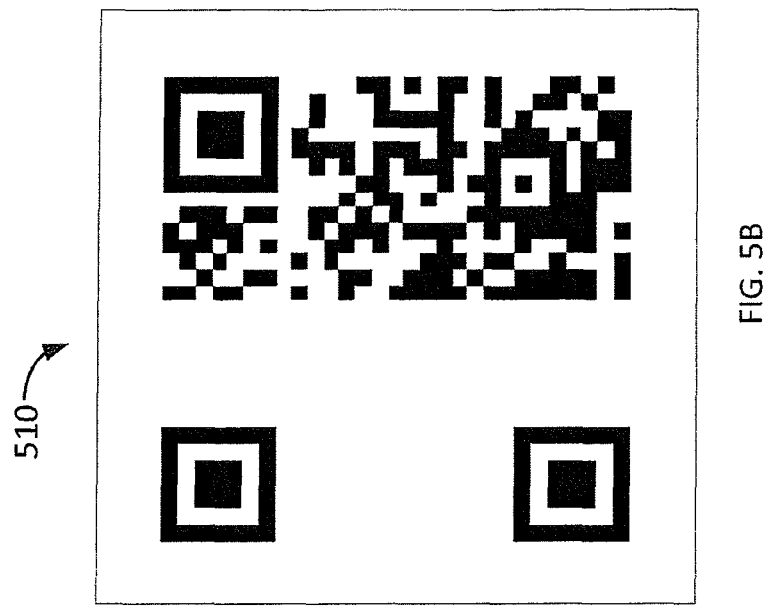
FIGS. 5A and 5B illustrate components of a partite optically readable code according to an example embodiment.
Figure 5A:
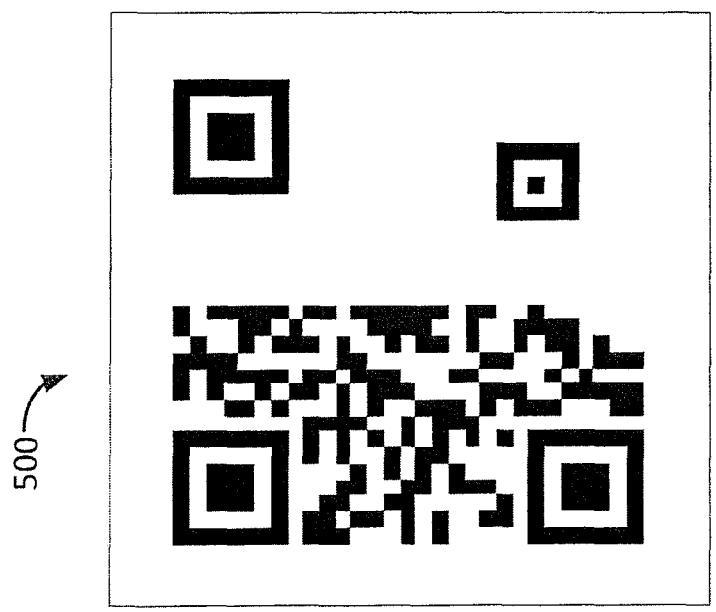

FIGS. 5A and 5B illustrate components of a partite optically readably code according to an example embodiment.

Referring to FIGS. 5A and 5B, an optically readable code may be partitioned into two components, such as splitting the optically readable code in half to create two distinct components. In one example, a first user may have access to one component 500 of the optically readable code while a second user may have access to a second component 510 of the optically readable code. The components may include an assembly algorithm or orientation pattern, for example, four distinctive boxes that may be used by the combination module 474 to orient the components and recombine the partite optically readable code. Components 500 and 510 may be unusable or unreadable separately, but may be combined to form a completed optically readable code that may be decoded by the decode module 476. In some cases, an optically readable code may be split similarly into any number of components with the addition of an orientation pattern that allows the components to be recombined.

When partitioning a partite optically readable code into at least two components, the level of error correction should be considered. If the total codewords remaining in each component of the optically readable code from the complete optically readable code is greater than the restoration percentage, then the component of the optically readable code will be able to represent the complete code without first being recombined with the remaining components. In order to create a component, codewords may be removed or corrupted through the partitioning process such that the complete optically readable code may not be capable of compensating for with error correction. Therefore, the example embodiments described herein are intended to ensure that the partition and combination of the partite optically readable code conserves the integrity of the code such that the decoding of the partite optically readable code does not produce irreparable errors. The embodiments described herein are further intended to ensure that a component of a partite optically readable code may not be decoded to provide access to the decoded content without first being combined with the further components to create a complete partite optically readable code.

In some cases, the components of the partite optically readable code may combine to produce a QR code. The partite optically readable code may conform to a QR code version and, once combined, include a finder pattern, a timing pattern, a version identifier, a quiet zone, a data area, an alignment pattern and format data. In some cases, the decode module 476 may be a decode module for a QR code system and may decode conventional QR codes as well as partite optically readable codes.

Figure 6A:
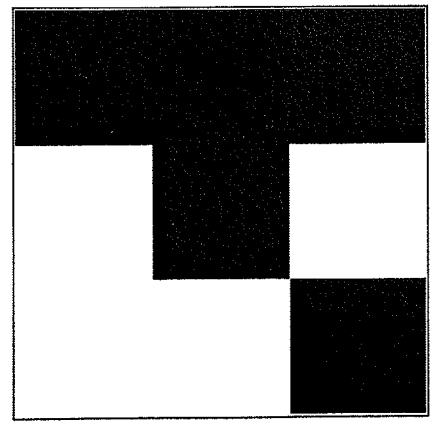
FIGS. 6A to 6C illustrate components of a partite optically readable code according to an example embodiment.
Figure 6B:
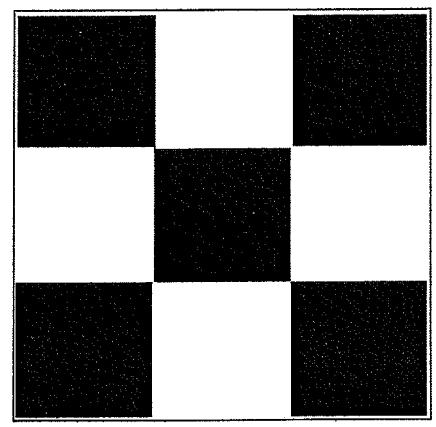
Figure 6C:
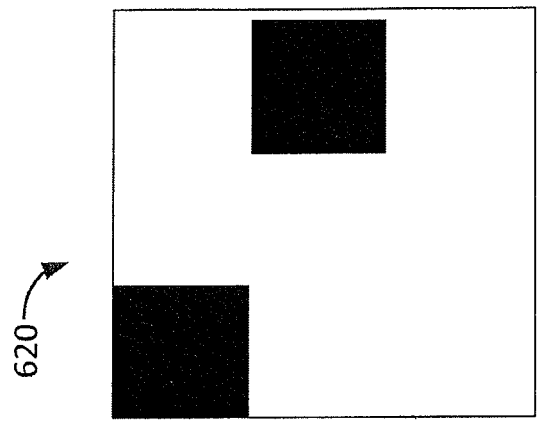

FIGS. 6A to 6C illustrate components of a partite optically readable code according to an example embodiment.

Referring to FIGS. 6A to 6C, an example for of partitioning and combining a partite optically readable code is provided. The optically readable code may be partitioned into two components 600 and 610. The example shown in FIGS. 6A to 6C represent a 3 by 3 portion of an optically readable code in order to illustrate an application of Boolean rules against a pixel-grid. It will be understood that a complete partite optically readable code may combine further rows and columns in a similar manner as the example represented in FIGS. 6A to 6C.

The components 600 and 610 may be combined using an assembly algorithm, for example, Boolean logic wherein each module is considered to be either 0 or 1. According to an example embodiment, the components 600 and 610 are combined using an exclusive disjunction (XOR) bit-mask over the optically readable code to get the partite optically readable code 620. It will be understood that the components may be combined using other assembly algorithms, for example, bit-addition, bit-subtraction, bit-multiplication, bit-division, or the like, or other Boolean logic, (e.g., negation (NOT), conjunction (AND), disjunction (OR), negation of conjunction (NAND), or negation of disjunction), or a combination of Boolean logic operators.

In a further example, the assembly algorithm may include interlacing the components of optically readable codes. For example, components may be partitioned into even and odd columns, even and odd rows, opposite checkerboards, or the like and combination data to recombine the components may be included in the assembly algorithm.

Figure 7:
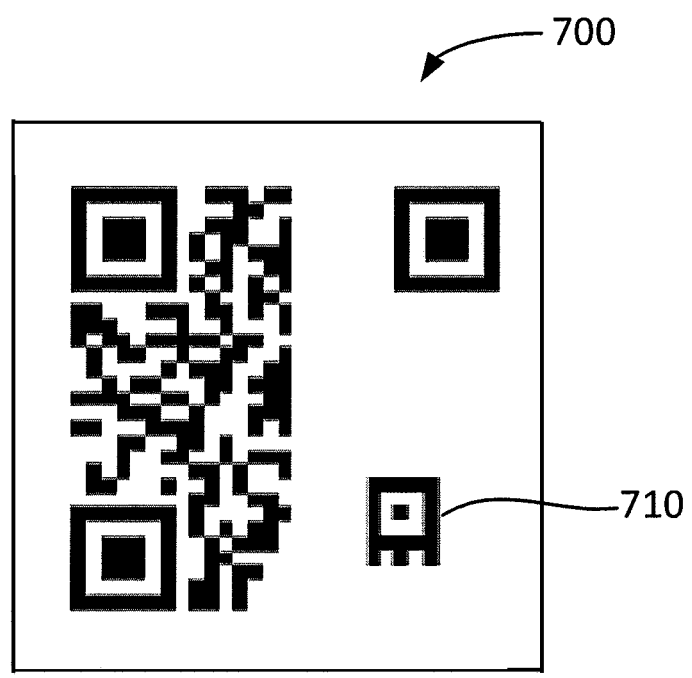
FIG. 7 illustrates a component of a partite optically readable code with an indicator according to an example embodiment.

FIG. 7 illustrates a component 700 of a partite optically readable code with an indicator according to an example embodiment.

Referring to FIG. 7, the component 700 includes an indicator 710. The indicator 710 may include combination data, for example, the number of components required for the complete partite optically readable code, the orientation pattern or assembly algorithm, a predetermined time interval for receiving the other components, or the like. The indicator 710 may be for example, an indicator bit, a series of bits or a code part. In some cases, the indicator may conform to the QR code specification if the resulting partite optically readable code is a QR code.

In some cases, the indicator 710 may be removed prior to combining the components on the optically readable code. In some cases, the components may include at least one indicator outside of the data module areas so as not to conflict with the partite optically readable code. In other cases, the indicator 710 may leverage the format information areas to encode combination data.

Figure 8:
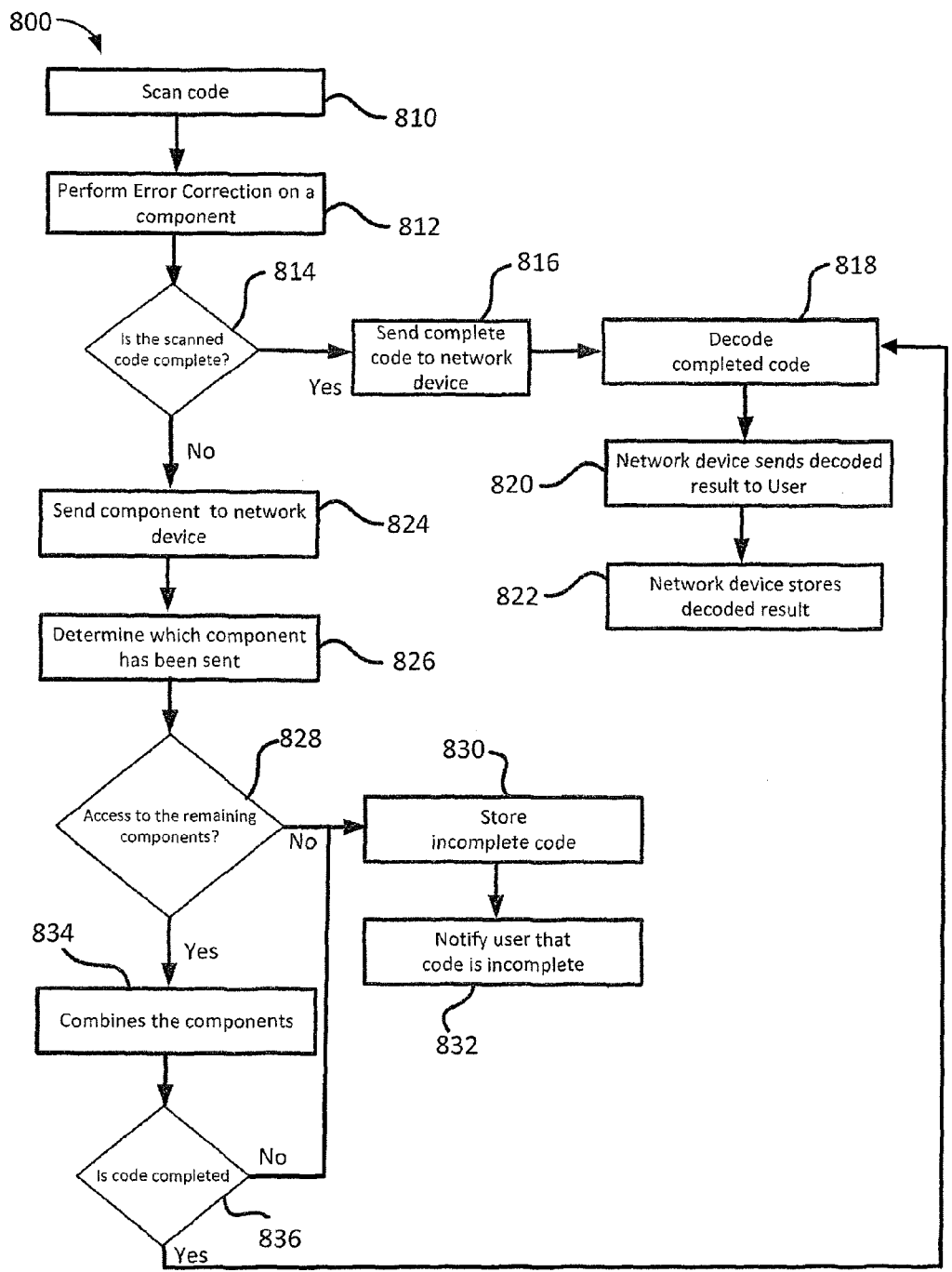
FIG. 8 is a flowchart of a method for partite optically readable codes according to an example embodiment.

FIG. 8 is a flowchart of a method 800 for partite optically readable codes according to an example embodiment.

Referring to FIG. 8, at 810, scanning module 422 scans at least one component of partite optically readable code.

At 812, the analysis module 426 may perform error correction on the at least one component or the error correction may be performed after the components of the partite optically readable code have been combined. In some cases, the error correction may be applied by the code module 470, prior to or after combining the components of the partite optically readable code.

At 814, the analysis module 426 determines whether the partite optically readable code is complete or whether any missing component of the partite optically readable code is stored in a local memory module, such as the database 412.

If the analysis module 426 determines that the partite optically readable code is complete at 814, then at 816, the partite optically readable code is sent to the network device 440. At 818, the code module 470 receives the component and the decode module decodes the partite optically readable code. At 820, the network device transmits the decoded results to the user device 410. In some cases, at 822, the network device 440 may store the decoded partite optically readable code results in a database 450.

If the analysis module 426 determines the scanned component is of an incomplete partite optically readable code and no other components are stored locally at 814, then at 824, the component of the partite optically readable code is sent to the network device 440. The network device 440 receives the component for analysis by the code module 470. At 826, the recognition module 472 determines the component format to establish the assembly algorithm required to assemble the components of the partite optically readable code. The recognition module 472 may further determine whether there are user authentication rights that are associated with the component of the partite optically readable code. At 828, the recognition module 472 may also determine whether the user has access to any remaining components of the partite optically readable code and whether any of the components are stored in a memory module of the network device 440.

If the network device 440 determines that the user does not have access to the at least one remaining component or if the at least one remaining component are not available or accessible at 828, then at 830, the code module 470 will store the received component. At 832, the network device 440 sends a notification to the user informing the user that the partite optically readable code needs at least one remaining component to be completed. In some cases, the network device 440 may inform the user of the number of remaining components required to have a completed code.

In other cases, the code module 470 may wait a predetermined time interval to determine if at least one remaining component is received within a predetermined time interval from the user or from a second user.

If the code module 470 retrieves at least one additional component of the partite optically readable code at 828, then at 834, the combination module 474 combines the components. The combination module 474 receives the assembly algorithm with instructions on how to combine the at least two components of the partite optically readable code. At 836, the code module 470 will determine whether the partite optically readable code is complete. If the partite optically readable code continues to lack at least one component, the at 830, the network device 440 will store the components. At 832, the user will be notified that the optically readable code remains incomplete.

If the partite optically readable code is complete, then at 818, the decode module 476 will decode the partite optically readable code. At 820, the network device 440 will send the decoded results to the user. At 822, the network device 440 may store the decoded results in a memory module. In some cases, the results may not be stored and the network device 440 will decode the results each time the network device 440 receives a completed partite optically readable code.

In an example, a partite optically readable code may be used in a scavenger hunt, for example, in a customer, student or employee engagement situation. Scavenger hunts may be used to introduce students or tourists to a variety of historical sites in, for example, a neighborhood, city, or the like. Scavenger hunts may also be used by media sources or by advertising departments to engage patrons by requiring the patrons to visit certain businesses or establishments. As a user completes an element of the scavenger hunt, the user may scan a component of a partite optically readable code. The system 400 may inform the user that the code remains incomplete until the user has accessed all the elements of the scavenger hunt. In some cases, the completed optically readable code may be decoded to tell the user the finish line. Although a plurality of users may be accessing the system 400, the system 400 is intended to ensure that each user can only access the components of the partite optically readable code which the user has previously scanned.

In the preceding description, for purposes of explanation, numerous details are set forth in order to provide a thorough understanding of the embodiments. However, it will be apparent to one skilled in the art that these specific details may not be required. In other instances, well-known structures are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method for a partite optically readable code, the method comprising:
   scanning, at a first user device, at least one component of the partite optically readable code, wherein the partite optically readable code comprises of at least two components;
   sending the at least one scanned component of the partite optically readable code to a network device;
   scanning, at a second user device, at least one remaining component of the partite optically readable code;
   sending the at least one remaining component of the partite optically readable code to the network device;
   determining whether all of the at least one components of the partite optically readable code are accessible;
   if all of the at least one components are accessible, combining all the components of the partite optically readable code;
   decoding the partite optically readable code; and
   otherwise storing, via a database, the received components of the partite optically readable code.

2. The method of claim 1, wherein the components of the partite optically readable code comprise separate physical sections of the partite optically readable code.

3. The method of claim 1, wherein the at least two components of the partite optically readable code are combined using an assembly algorithm.

4. The method of claim 3, wherein the assembly algorithm is bit-addition, bit-subtraction, bit-multiplication, bit-division, or logical bit-operations.

5. The method of claim 3, wherein the assembly algorithm comprises combination data related to combining interlaced segments of the partite optically readable code.

6. The method of claim 1, wherein the components of the partite optically readable code include at least one of a finder pattern, a timing pattern, a quiet zone, an alignment, a version, an identification, or a formatting facet.

7. The method of claim 1, wherein one of a finder pattern, a timing pattern, a quiet zone, an alignment, a version, an identification facet or a formatting facet of the partite optically readable code includes an indicator of an assembly algorithm to be performed.

8. The method of claim 1, wherein the combining of the components of the partite optically readable code comprises determining whether the combined components are a completed partite optically readable code or a component of a larger aggregate partite optically readable code.

9. A non-transitory computer readable medium containing instructions that, when executed, perform the method of claim 1.

10. The method of claim 1, wherein if the at least one remaining component from the second user device is received within a predetermined time interval, decoding the partite optically readable code; otherwise notifying the first user or the second user that the at least one remaining component was not received within the predetermined time interval.

11. The method of claim 10, wherein the predetermined time interval is an amount of time in which the at least one scanned component is sent to or received by the network device.

12. A system for a partite optically readable code, the system comprising:
   a first user device comprising:
      a scanner configured to scan a component of the partite optically readable code, wherein the partite optically readable code comprises at least two components; and
      a transmitter configured to send the scanned component of the partite optically readable code to a network device;
   a second user device comprising:
      a scanner configured to scan at least one remaining component of the partite optically readable code; and
      a transmitter configured to send the at least one remaining component to the network device; and
   the network device comprising:
      a processor configured to receive the components from the first user device and the second user device, to determine whether all of the components of the partite optically readable code are accessible, if all of the components are accessible, to combine the components of the partite optically readable code, and to decode the partite optically readable code, otherwise store the received components of the partite optically readable code.

13. The system of claim 12, wherein the components of the partite optically readable code comprise separate physical sections of the partite optically readable code.

14. The system of claim 12, wherein the at least two components of the partite optically readable code are combined using an assembly algorithm.

15. The system of claim 14, wherein the assembly algorithm is bit-addition, bit-subtraction, bit-multiplication, bit-division, or logical bit-operations.

16. The system of claim 14, wherein the assembly algorithm comprises combination data related to combining interlaced segments of the partite optically readable code.

17. The system of claim 12, wherein one of a finder pattern, a timing pattern, a quiet zone, an alignment, a version, an identification or a formatting facet of the optically readable code includes an indicator of an assembly algorithm to be performed.

* * * * *